US010222715B2

(12) United States Patent
Ozawa et al.

(10) Patent No.: US 10,222,715 B2
(45) Date of Patent: Mar. 5, 2019

(54) BINDER RESIN FOR TONER, TONER, AND MANUFACTURING METHOD THEREFOR

(71) Applicant: Mitsubishi Chemical Corporation, Chiyoda-ku (JP)

(72) Inventors: Tadahiro Ozawa, Tokyo (JP); Yoko Tamura, Tokyo (JP); Kanako Funabashi, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 15/577,585

(22) PCT Filed: Jun. 1, 2016

(86) PCT No.: PCT/JP2016/066250
§ 371 (c)(1),
(2) Date: Nov. 28, 2017

(87) PCT Pub. No.: WO2016/194969
PCT Pub. Date: Dec. 8, 2016

(65) Prior Publication Data
US 2018/0136576 A1    May 17, 2018

(30) Foreign Application Priority Data

Jun. 1, 2015  (JP) ................. 2015-111332
Dec. 22, 2015  (JP) ................. 2015-249773
Dec. 22, 2015  (JP) ................. 2015-249774

(51) Int. Cl.
*G03G 9/087*  (2006.01)
*G03G 9/08*  (2006.01)
*C08L 67/02*  (2006.01)

(52) U.S. Cl.
CPC .......... *G03G 9/08755* (2013.01); *C08L 67/02* (2013.01); *C08L 67/025* (2013.01); *G03G 9/081* (2013.01); *G03G 9/087* (2013.01); *G03G 9/0815* (2013.01); *G03G 9/0819* (2013.01); *G03G 9/0821* (2013.01); *G03G 9/08795* (2013.01); *G03G 9/08797* (2013.01); *C08L 2205/025* (2013.01)

(58) Field of Classification Search
CPC ................. G03G 9/0802; G03G 9/08755
See application file for complete search history.

(56) References Cited

U.S. PATENT DOCUMENTS

| | | |
|---|---|---|
| 2010/0099037 A1 | 4/2010 | McAneney-Lannen et al. |
| 2011/0003243 A1 | 1/2011 | Sacripante et al. |
| 2011/0212396 A1 | 9/2011 | Farrugia et al. |
| 2014/0377700 A1* | 12/2014 | Mine ............... G03G 9/08755 430/109.4 |
| 2015/0152219 A1 | 6/2015 | Tamura et al. |
| 2015/0291730 A1 | 10/2015 | Tamura et al. |

FOREIGN PATENT DOCUMENTS

| | | | |
|---|---|---|---|
| DE | 10 2011 003 584 A1 | 9/2011 | |
| EP | 2 523 046 A2 | 11/2012 | |
| EP | 2 862 885 A1 | 4/2015 | |
| JP | 5-165252 A | 7/1993 | |
| JP | 06-332250 | * 12/1994 | ............ G03G 9/087 |
| JP | 6-332250 A | 12/1994 | |
| JP | 2003-162091 | * 6/2003 | ............ G03G 9/087 |
| JP | 2003-162091 A | 6/2003 | |
| JP | 2010-241878 A | 10/2010 | |
| JP | 2010-285555 A | 12/2010 | |
| JP | 2011-75960 A | 4/2011 | |
| JP | 4740313 B2 | 8/2011 | |
| JP | 2012-58337 A | 3/2012 | |
| JP | 5465471 B2 | 4/2014 | |
| JP | 2014-137488 A | 7/2014 | |
| JP | 2014-209246 A | 11/2014 | |
| WO | 2014/088097 A1 | 6/2014 | |

OTHER PUBLICATIONS

Translation of JP 06-332250.*
Translation of JP 2003-162091.*
International Search Report dated Aug. 9, 2016 in PCT/JP2016/066250 filed Jun. 1, 2016.
International Search Report dated Jul. 12, 2016 in PCT/JP2016/066189 filed Jun. 1, 2016.
Extended European Search Report dated Mar. 23, 2018 in Patent Application No. 16803383.5.
Extended European Search Report dated Mar. 23, 2018 in Patent Application No. 16803403.1.
U.S. Office Action as received in Corresponding U.S. Appl. No. 15/576,867 dated Sep. 28. 2018.
U.S. Office Action as received in corresponding U.S. Appl. No. 15/576,867 dated Dec. 14, 2018.

* cited by examiner

*Primary Examiner* — Peter L Vajda
(74) *Attorney, Agent, or Firm* — Oblon, McClelland, Maier & Neustadt, L.L.P.

(57) ABSTRACT

A binder resin for toner of the present invention comprising: a polyester resin (A) which contains a constitutional unit derived from isosorbide and has a softening temperature of 120° C. or lower; and a polyester resin (B) different from the polyester resin (A), wherein the binder resin for toner has a hygroscopicity index of 2 or less and contains a tetrahydrofuran-insoluble matter at 5% by mass or less.

17 Claims, No Drawings

BINDER RESIN FOR TONER, TONER, AND MANUFACTURING METHOD THEREFOR

TECHNICAL FIELD

The present invention relates to a binder resin for toner, a toner, and a method for manufacturing the toner.

This application is based upon and claims the benefit of priority of the prior Japanese Patent Application No. 2015-111332 filed in Japan on Jun. 1, 2015, the prior Japanese Patent Application No. 2015-249773 filed in Japan on Dec. 22, 2015, and the prior Japanese Patent Application No. 2015-249774 filed in Japan on Dec. 22, 2015, the entire contents of which are incorporated herein by reference.

BACKGROUND ART

In a method of obtaining an image by an electrophotographic printing method or an electrostatic charge developing method, an electrostatic charge image formed on a photoreceptor is developed with a toner charged by friction in advance and then fixed. In this process, the toner is required to firstly maintain a stable electric charge amount and to secondly exhibit fixability to the paper.

In addition, an apparatus to be used for obtaining an image by an electrophotographic printing method or an electrostatic charge developing method has a fixing section of a heating member, the temperature in the apparatus thus increases, and the toner is thus required not to block, namely, to exhibit storage stability.

Particularly in the fixing method using a heat roller, a decrease in temperature of the fixing section has been progressed from the viewpoint of energy saving, and the toner has been thus strongly required to exhibit low temperature fixability. In addition, a roller which is not coated with oil has been used as miniaturization of the apparatuses has been progressed, and the toner has been highly required to exhibit releasability from the heat roller, namely, non-offset property.

It is also required that dirt on the apparatus even at the time of continuous printing and fogging at the time of printing are not observed, that is, durability of the toner is required.

A binder resin for toner greatly affects the toner properties as described above, and a polystyrene resin, a styrene acrylic resin, a polyester resin, an epoxy resin, a polyamide resin, and the like are known. Recently, a polyester resin has particularly attracted attention since it exhibits excellent storage stability, low temperature fixability, non-offset property, durability, pulverizability at the time of manufacture of toner, and the like and exhibits performances in a favorable balance.

For example, Patent Literature 1 proposes a toner exhibiting excellent low temperature fixability, hot offset resistance, glossiness, durability, and storage stability:

Examples of the method for manufacturing a toner using a polyester resin may include a pulverization method and a chemical method. The pulverization method is a method of obtaining a toner by melting and kneading a polyester resin, a pigment (coloring agent), a releasing agent and the like, finely pulverizing the kneaded product thus obtained by using a pulverizer or the like, and classifying the pulverized product, and the pulverization method is industrially widely used. In recent years, a decrease in particle diameter of toner is desired in order to realize a high image quality of an image to be formed. In order to decrease the particle diameter of toner, the energy and time required for pulverization increase, the manufacturing process is complicated, and further the yield decreases in the pulverization method. Hence, a chemical method capable of more efficiently decreasing the particle diameter has increasing attracted attention.

Examples of the chemical method may include a method in which a material containing a polyester resin and other substances to be blended in the toner are dissolved or dispersed in an organic solvent capable of dissolving the polyester resin, the liquid is dispersed in an aqueous medium containing a dispersion stabilizer, granulation is conducted, the organic solvent is then removed from the resultant, the particles thus obtained are separated, washed, and dried to obtain toner particles; and a method in which a polyester resin is dissolved in an organic solvent, the liquid is emulsified in an aqueous medium containing a dispersion stabilizer if necessary, the organic solvent is removed from the emulsion to obtain a resin emulsion, other substances to be blended in the toner are finely dispersed in an aqueous medium, the dispersion is mixed with the resin emulsion, the fine particles are aggregated and thermally fused to obtain particles, the particles thus obtained are separated, washed, and dried to obtain toner particles.

In the case of a chemical toner manufacturing method using an organic solvent, process passability deteriorates, the thermal properties for each toner particle to be obtained and the amounts, mixing states, and the like of the substances to be blended in the toner are nonuniform, and troubles such as an harmful effect on the performance of toner are thus caused when a polyester resin exhibiting insufficient solvent solubility is used. Hence, it is important for the polyester resin not to have a solvent-insoluble matter derived from gel, a crystal component, and the like and to exhibit favorable solvent solubility.

On the other hand, in recent years, a carbon neutral strategy has particularly attracted attention from the viewpoint of environmental protection such as suppression of global warming, and it has been actively attempted to change plastics derived from conventional petroleum raw materials to plastics derived from vegetable raw materials with lower environmental impact. The use of components derived from vegetable raw materials in toner is also investigated.

For example, Patent Literature 2 proposes a toner using a binder resin for toner containing a raw material component derived from vegetables.

CITATION LIST

Patent Literature

Patent Literature 1: JP 2011-75960 A
Patent Literature 2: JP 2010-285555 A

SUMMARY OF THE INVENTION

Problem to be Solved by the Invention

However, the resin for toner of Patent Literature 1 is hardly broken at the time of pulverization and the pulverizability is insufficient. In addition, the solvent solubility is insufficient in some cases. The toner described in Patent Literature 2 exhibits insufficient storage stability, particularly storage stability under a high humidity condition.

An object of the invention is to provide a binder resin for toner which exhibits favorable pulverizability and solvent solubility and can provide a toner exhibiting excellent storage stability, low temperature fixability, non-offset property, and durability, a toner using this, and a method for manufacturing the toner.

Means for Solving Problem

The invention has the following aspects.
[1] A binder resin for toner containing a polyester resin (A) which contains a constitutional unit derived from isosorbide and has a softening temperature of 120° C. or lower and a polyester resin (B) different from the polyester resin (A), in which the binder resin for toner has a hygroscopicity index of 2 or less and contains a tetrahydrofuran-insoluble matter at 5% by mass or less.
[2] The binder resin for toner according to [1], in which a ratio of the number of carbon atoms contained in a constitutional unit derived from isosorbide to the number of entire carbon atoms contained in the polyester resin (A) is from 0.1% to 30%.
[3] The binder resin for toner according to [1] or [2], in which the polyester resin (A) is a polycondensate of a monomer mixture containing either or both of a tri- or higher polycarboxylic acid and a trihydric or higher polyhydric alcohol in a range of from 0.1% to 80% by mole with respect to the total number of moles of entire acid components.
[4] The binder resin for toner according to any one of [1] to [3], in which a softening temperature of the polyester resin (B) is 120° C. or lower.
[5] The binder resin for toner according to any one of [1] to [4], in which a ratio of the number of carbon atoms contained in a constitutional unit derived from isosorbide to the number of entire carbon atoms contained in the polyester resin (B) is less than 1%.
[6] The binder resin for toner according to any one of [1] to [5], in which a mass ratio of the polyester resin (A) to the polyester resin (B) is from 5:95 to 95:5.
[7] A toner containing the binder resin for toner according to any one of [1] to [6].
[8] A method for manufacturing the toner according to [7], the method including a step of dissolving the binder resin for toner in an organic solvent.

Effect of the Invention

According to the invention, it is possible to provide a binder resin for toner which exhibits favorable pulverizability and solvent solubility and can provide a toner exhibiting excellent storage stability, low temperature fixability, non-offset property, and durability, a toner using this, and a method for manufacturing the toner.

MODE(S) FOR CARRYING OUT THE INVENTION

<<Binder Resin for Toner>>

The binder resin for toner of the invention contains a polyester resin (A) and a polyester resin (B).

The binder resin for toner of the invention may further contain a binder resin other than the polyester resin (A) and the polyester resin (B) as long as the effect of the invention is not impaired.

<Polyester Resin (A)>

A "polyester resin" is a polycondensate of a monomer mixture containing a polycarboxylic acid and a polyhydric alcohol, and it contains a constitutional unit derived from a polycarboxylic acid and a constitutional unit derived from a polyhydric alcohol.

The polyester resin (A) contains at least a constitutional unit derived from isosorbide as the constitutional unit derived from a polyhydric alcohol. This makes the pulverizability and solvent solubility of the binder resin for toner favorable.

Examples of the polycarboxylic acid in the constitutional unit derived from a polycarboxylic acid may include aromatic dicarboxylic acids such as terephthalic acid, isophthalic acid, phthalic acid, dimethyl terephthalate, dimethyl isophthalate, diethyl terephthalate, diethyl isophthalate, dibutyl terephthalate, dibutyl isophthalate; and esters and acid anhydrides thereof; aliphatic dicarboxylic acids such as sebacic acid, isodecylsuccinic acid, dodecenylsuccinic acid, maleic acid, fumaric acid, adipic acid, succinic acid; and esters and acid anhydrides thereof; and tri- or higher polycarboxylic acids such as trimellitic acid, pyromellitic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,2,7,8-octanetetracarboxylic acid, and esters and acid anhydrides thereof. These may be vegetable-derived substances or petroleum-derived substances, and any one kind thereof may be used singly or two or more kinds thereof may be used in combination.

As the polycarboxylic acid, aromatic dicarboxylic acids such as terephthalic acid and isophthalic acid and tri- or higher polycarboxylic acids are preferable. Trimellitic acid or an anhydride thereof is preferable as the tri- or higher polycarboxylic acid.

The polyester resin (A) may contain a constitutional unit derived from a polyhydric alcohol other than the constitutional unit derived from isosorbide as long as the effect of the invention is not impaired.

Examples of another polyhydric alcohol may include aliphatic diols such as ethylene glycol, neopentyl glycol, polyethylene glycol, 1,2-propanediol, 1,3-butanediol, 1,4-butanediol, diethylene glycol, triethylene glycol, 1,4-cyclohexanedimethanol, and erythritane; aromatic diols such as polyoxypropylene(2.3)-2,2-bis(4-hydroxyphenyl)propane, polyoxyethylene(2.0)-2,2-bis(4-hydroxyphenyl)propane, polyoxypropylene(2.0)-2,2bis(4-hydroxyphenyl) propane, polyoxypropylene(2.2)-polyoxyethylene(2.0)-2,2-bis(4-hydroxyphenyl) propane, polyoxypropylene(6)-2,2-bis(4-hydroxyphenyl)propane, polyoxypropylene(2.2)-2,2-bis(4-hydroxyphenyl)propane, polyoxypropylene(2.4)-2,2-bis (4-hydroxyphenyl)propane, and polyoxypropylene(3.3)-,2,2-bis(4-hydroxyphenyl)propane; trihydric or higher alcohols such as sorbitol, 1,2,3,6-hexatetrol, 1,4-sorbitan, pentaerythritol, dipentaerythritol, tripentaerythritol, 1,2,4-butanetriol, 1,2,5-pentanetriol, glycerol, 2-methyl-1,2,3-propanetriol, 2-methyl-1,2,4-butanetriol, trimethylolpropane, and 1,3,5-trihydroxymethylbenzene. These may be vegetable-derived substances or petroleum-derived substances, and any one kind thereof may be used singly or two or more kinds thereof may be used in combination.

Incidentally, the numerical values in the parentheses added after polyoxyethylene or polyoxypropylene indicate the average number of moles of oxyethylene groups or oxypropylene groups added.

As another polyhydric alcohol, ethylene glycol, neopentyl glycol, 1,2-propanediol, 1,3-butanediol, 1,4-butanediol, 1,4-cyclohexanedimethanol, polyoxyethylene(2.0)-2,2bis (4-hydroxyphenyl)propane, polyoxypropylene(2.3)-2,2-bis(4-hydroxyphenyl)propane, and trihydric or higher alcohol are preferable. As the trihydric or higher alcohol, glycerin and trimethylolpropane are preferable.

The polyester resin (A) may further contain a constitutional unit derived from a monohydric alcohol, a constitutional unit derived from a monocarboxylic acid, and the like as long as the effect of the invention is not impaired. In the case of containing these monovalent constitutional units, these monovalent constitutional units are likely to be present at the terminals of the molecular chains of the polyester resin. It is effective to contain a constitutional unit derived from a monohydric alcohol or a constitutional unit derived from a monocarboxylic acid at the terminal of polymer in order to improve the dispersibility of toner member, to improve the resistance to moisture absorption by the resin by adjusting the acid value of carboxylic acid and the hydroxyl value, and thus to stabilize the charging property of the toner.

Examples of the monohydric alcohol may include aromatic monohydric alcohols having 30 or less carbon atoms such as benzyl alcohol; and aliphatic monohydric alcohols having 30 or less carbon atoms such as oleyl alcohol, lauryl alcohol, cetyl alcohol, stearyl alcohol, and behenyl alcohol.

Examples of the monocarboxylic acid may include aromatic monocarboxylic acids having 30 or less carbon atoms such as benzoic acid, p-methylbenzoic acid, and cinnamic acid; and aliphatic carboxylic acids having 30 or less carbon atoms such as stearic acid, behenic acid, oleic acid, linoleic acid, and linolenic acid.

The content of the constitutional unit derived from isosorbide in the polyester resin (A) is preferably in a range in which the ratio of the number of carbon atoms contained in the constitutional unit derived from isosorbide to the number of entire carbon atoms contained in the polyester resin (A) (hereinafter referred to as the "isosorbide-derived carbon atom ratio" in some cases) is from 0.1% to 30%. The isosorbide-derived carbon atom ratio is more preferably from 0.1% to 20% and particularly preferably from 0.5% to 15%. The pulverizability and solvent solubility of the binder resin for toner are superior when the isosorbide-derived carbon atomic ratio is equal to or more than the lower limit value. The durability of the binder resin for toner and the storage stability at a high humidity and fixability of the toner are superior when the isosorbide-derived carbon atom ratio is equal to or less than the upper limit value.

The content of the constitutional unit derived from isosorbide in the polyester resin (A) is preferably 0.1% by mole or more, more preferably from 0.1% to 50% by mole, still more preferably from 3% to 40% by mole, and particularly preferably from 5% to 30% by mole with respect to the total number of moles of the constitutional units derived from all the polycarboxylic acids. The pulverizability and solvent solubility of the binder resin for toner are superior when the content of the constitutional unit derived from isosorbide is equal to or more than the lower limit value. The durability of the binder resin for toner and the storage stability at a high humidity and fixability of the toner are superior when the content of the constitutional unit derived from isosorbide is equal to or less than the upper limit value.

It is preferable that the polyester resin (A) contains either or both of a constitutional unit derived from a tri- or higher polycarboxylic acid and a constitutional unit derived from a trihydric or higher polyhydric alcohol. In this case, the content of the constitutional unit derived from a tri- or higher polycarboxylic acid and the constitutional unit derived from a trihydric or higher polyhydric alcohol (hereinafter collectively referred to as the "constitutional units derived from trivalent or higher monomers" in the polyester resin (A) is preferably in a range of from 0.1% to 80% by mole, more preferably from 1% to 60% by mole, and particularly preferably from 1% to 50% by mole with respect to the total number of moles (100% by mole) of the constitutional units derived from all the polycarboxylic acids. The anti-offset property on the high temperature side of the toner is superior when the content of the constitutional units derived from trivalent or higher monomers is equal to or more than the lower limit value. When the content of the constitutional units derived from trivalent or higher monomers is equal to or less than the upper limit value, the formation of gel (solvent-insoluble matter) can be suppressed and the solvent solubility is superior. In addition, the glossiness in the case of being used in a color toner is also favorable.

The content of the constitutional unit derived from a tri- or higher polycarboxylic acid in the polyester resin (A) is preferably 0.1% by mole or more, more preferably from 0.1% to 80% by mole, still more preferably from 1% to 60% by mole, and particularly preferably from 1% to 50% by mole with respect to the total number of moles (100% by mole) of the constitutional units derived from all the polycarboxylic acids. The anti-offset property on the high temperature side of the toner is superior when the content of the constitutional unit derived from a tri- or higher polycarboxylic acid is equal to or more than the lower limit value. When the content of the constitutional unit derived from a tri- or higher polycarboxylic acid is equal to or less than the upper limit value, the formation of gel (solvent-insoluble matter) can be suppressed and the solvent solubility is superior. In addition, the glossiness in the case of being used in a color toner is also favorable.

The content of the constitutional unit derived from a trihydric or higher polyhydric alcohol in the polyester resin (A) is preferably 0.1% by mole or more, more preferably from 0.1% to 80% by mole, still more preferably from 1% to 60% by mole, and particularly preferably from 1% to 50% by mole with respect to the total number of moles (100% by mole) of the constitutional units derived from all the polycarboxylic acids. The anti-offset property on the high temperature side of the toner is superior when the content of the constitutional unit derived from a trihydric or higher polyhydric alcohol is equal to or more than the lower limit value. When the content of the constitutional unit derived from a trihydric or higher polyhydric alcohol is equal to or less than the upper limit value, the formation of gel (solvent-insoluble matter) can be suppressed and the solvent solubility is superior. In addition, the glossiness in the case of being used in a color toner is also favorable.

The softening temperature of the polyester resin (A) is 120° C. or lower. The low temperature fixability of the toner and the solvent solubility of the binder resin for toner are excellent when the softening temperature of the polyester resin (A) is 120° C. or lower.

The softening temperature of the polyester resin (A) is preferably 75° C. or higher and more preferably 80° C. or higher from the viewpoint of storage stability of the toner.

Hence, the softening temperature of the polyester resin (A) is preferably 75° C. or higher and 120° C. or lower and more preferably 80° C. or higher and 120° C. or lower.

The softening temperature of the polyester resin is measured by the method described in Examples to be described later.

The softening temperature of the polyester resin can be adjusted by the degree of polymerization, a composition of raw materials and the ratio thereof, and the like. For example, the softening temperature tends to increase as the degree of polymerization increases.

The glass transition temperature (Tg) of the polyester resin (A) is preferably from 35° C. to 85° C. and more preferably from 35° C. to 82° C. The storage stability of the toner is superior when the Tg is equal to or higher than the lower limit value of the above range, and the low temperature fixability of the toner is superior when the Tg is equal to or lower than the upper limit value of the above range.

The Tg of the polyester resin is measured by the method described in Examples to be described later. The Tg of the polyester resin can be adjusted by adjusting a composition of raw materials and the ratio thereof, the degree of polymerization, and the like. For example, the Tg tends to increase as the polyester resin (A) contains more constitutional units derived from isosorbide.

The acid value of the polyester resin (A) is preferably from 0.1 to 60 mg KOH/g and more preferably from 0.1 to 50 mg KOH/g. The productivity of the resin tends to be improved when the acid value of the polyester resin (A) is equal to or more than the lower limit value of the above range, and the polyester resin (A) becomes a resin exhibiting excellent resistance to moisture and the toner is hardly affected by the usage environment when the acid value is equal to or less than the upper limit value of the above range.

The acid value of the polyester resin is measured by the method described in Examples to be described later.

The weight average molecular weight (Mw) of the polyester resin (A) is preferably from 500 to 1,000,000 and more preferably from 500 to 800,000. The durability of the toner is superior when the Mw of the polyester resin (A) is equal to or more than the lower limit value of the above range, and the low temperature fixability of the toner is superior when the Mw is equal to or less than the upper limit value of the above range.

The number average molecular weight (Mn) of the polyester resin (A) is preferably from 500 to 100,000 and more preferably from 500 to 50,000.

The peak top molecular weight (Mp) of the polyester resin (A) is preferably from 500 to 100,000 and more preferably from 500 to 50,000.

The Mw, Mn, and Mp of the polyester resin are values in terms of standard polystyrene to be measured by gel permeation chromatography. For details, these are measured by the method described in Examples to be described later.

The tetrahydrofuran (THF)-insoluble matter in the polyester resin (A) is preferably from 0% to 40% by mass, more preferably from 0% to 20% by mass, and still more preferably from 0% to 10% by mass. The solvent solubility of the binder resin for toner is superior when the THF-insoluble matter in the polyester resin (A) is equal to or less than the upper limit value of the above range.

The THF-insoluble matter in the polyester resin (A) is measured by the method described in Examples to be described later.

The polyester resin (A) can be obtained by polycondensation of a monomer mixture containing a polycarboxylic acid and a polyhydric alcohol. The polyhydric alcohol includes at least a substance containing a constitutional unit derived from isosorbide and may include a polyhydric alcohol other than the substance containing a constitutional unit derived from isosorbide. The substance containing a constitutional unit derived from isosorbide is a divalent alcohol containing a structure to be represented by Formula 1, and examples thereof may include isosorbide and an alkylene oxide adduct of isosorbide. The monomer mixture may further contain a monohydric alcohol, a monocarboxylic acid, and the like if necessary.

[Chem. 1]

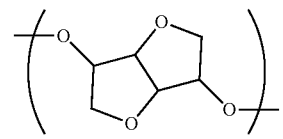

(Formula 1)

The content of each monomer in the monomer mixture is set depending on the content of the constitutional unit derived from each monomer in the polyester resin (A) and the like. The composition of the monomer mixture (the proportion of each monomer to the total amount of all the monomers) is almost equal to the composition of the polyester resin (the proportion of each constitutional unit to the total amount of all the constitutional units) to be obtained from this monomer mixture.

A polyester resin containing a constitutional unit derived from isosorbide at 0.1% by mole or more with respect to the total number of moles of the constitutional units derived from all the polycarboxylic acids, for example, when the proportion of the substance containing a constitutional unit derived from isosorbide to the total number of moles of the entire acid components in the monomer mixture is set to 0.1% by mole or more. A polyester resin having an isosorbide-derived carbon atom ratio of from 0.1% to 30% is obtained when the ratio of the number of carbon atoms contained in the substance containing a constitutional unit derived from isosorbide to the number of entire carbon atoms contained in the monomer mixture is set to from 0.1% to 30%.

The content (% by mold) of the trivalent or higher monomer component with respect to the total number of moles (100% by mole) of the entire acid components in the monomer mixture is almost equal to the content (% by mole) of the constitutional unit derived from a trivalent or higher monomer with respect to the total number of moles (100% by mole) of the constitutional units derived from all the polycarboxylic acids in the polyester resin to be obtained.

The "entire acid components" is the sum of all the polycarboxylic acids.

The polycondensation of the monomer mixture can be conducted by a known method, and it is not particularly limited. Examples of the method of polycondensation may include a method in which the monomer mixture is introduced into a reaction vessel and polymerized through an esterification reaction or a transesterification reaction and a polycondensation reaction.

The polymerization temperature is not particularly limited, but it is preferably set to be in a range of from 180° C. to 280° C. The productivity tends to be favorable in a case in which the polymerization temperature is 180° C. or higher, and the decomposition of the resin and the production of a by-product of volatile matter which causes odor tends to be suppressed in a case in which the polymerization temperature is 280° C. or lower. The lower limit value of the polymerization temperature is more preferably 200° or higher and particularly preferably 220° or higher. The upper limit value of the polymerization temperature is more preferably 270° or lower.

The polycondensation of the monomer mixture may be conducted in the presence of a polymerization catalyst.

Examples of the polymerization catalyst may include titanium tetraalkoxide, titanium oxide, dibutyltin oxide, tin acetate, zinc acetate, tin disulfide, antimony trioxide, germanium dioxide, magnesium acetate, and calcium acetate. Among these, titanium tetraalkoxide is preferable since it particularly has a great effect of accelerating the reaction rate.

The amount of the polymerization catalyst added at the time of polycondensation is preferably from 0 to 0.2 parts by mass with respect to 100 parts by mass of the entire raw materials.

The polycondensation of the monomer mixture may be conducted in the presence of a releasing agent. By conducting the polycondensation in the presence of a releasing agent, the fixability of the toner and the dispersibility in wax tend to be improved.

Examples of the releasing agent may include the same ones as those to be mentioned later as other components, and any one kind thereof may be used singly or two or more kinds thereof may be used in combination.

The amount of the releasing agent added at the time of polycondensation can be appropriately set to be in a range in which the effect of the invention is not impaired.

After the polymerization is completed, the contents are discharged from the apparatus in a bulk form and subjected to a pulverization step if necessary. The polyester resin (A) is thus obtained. The polyester resin (A) of the invention exhibits favorable pulverizability, and it can be thus efficiently pulverized until to have a fine particle diameter.

Examples of a method of judging whether or not the polyester resin (A) and the binder resin for toner and the toner which contain the polyester resin (A) are synthesized from isosorbide (compound derived from biomass) may include ASTM D6866 based on the principle of C14 (radioactive carbon) dating. Specifically, the concentration of the biomass ratio can be specified by a method in which the sample (resin) is dried to remove moisture and then weighed and $CO_2$ generated by burning the sample is adsorbed to an adsorbent via a chemical operation and subjected to the measurement using a liquid scintillation counter, a method in which $CO_2$ generated by burning the sample is formed into carbon graphite and subjected to the measurement using an accelerator mass spectrometer, a method in which benzene is synthesized from $CO_2$ generated by burning the sample and subjected to the measurement using a liquid scintillation counter, and the like.

<Polyester Resin (B)>

The polyester resin (B) is a polyester resin different from the polyester resin (A).

The polyester resin (B) is different from the polyester resin (A) typically in at least one of the softening temperature, the content of the constitutional unit derived from isosorbide, the content of the constitutional unit derived from a tri- or higher polycarboxylic acid and/or the content of the constitutional unit derived from a trihydric or higher polyhydric alcohol.

The polyester resin (B) contains a constitutional unit derived from a polycarboxylic acid and a constitutional unit derived from a polyhydric alcohol. The polyester resin (B) may further contain a constitutional unit derived from a monohydric alcohol, a constitutional unit derived from a monocarboxylic acid, and the like as long as the effect of the invention is not impaired.

Examples of the polycarboxylic acid, polyhydric alcohol, monohydric alcohol, and monocarboxylic acid may include the same ones as those mentioned for the polyester resin (A), respectively, and preferred aspects thereof are also the same. However, the polyester resin (B) may or may not contain a constitutional unit derived from isosorbide as the constitutional unit derived from a polyhydric alcohol.

The content of the constitutional unit derived from isosorbide in the polyester resin (B) is preferably in a range in which the isosorbide-derived carbon atom ratio, namely, the ratio of the number of carbon atoms contained in the constitutional unit derived from isosorbide to the number of entire carbon atoms contained in the polyester resin (B) is less than 1%. The isosorbide-derived carbon atom ratio in the polyester resin (B) is more preferably less than 0.3%, and it may be 0%. The durability and storage stability at a high humidity of the toner are superior when the isosorbide-derived carbon atom ratio is equal to or less than the upper limit value.

Hence, it is preferable that the polyester resin (B) does not contain a constitutional unit derived from isosorbide or contains the constitutional unit derived from isosorbide in a range in which the isosorbide-derived carbon atom ratio is more than 0% and less than 1% (more preferably more than 0% and less than 0.3%).

In a case in which the polyester resin (B) contains either or both of constitutional units derived from trivalent or higher monomers, namely, a constitutional unit derived from a tri- or higher polycarboxylic acid and a constitutional unit derived from a trihydric or higher polyhydric alcohol, the content of the constitutional units derived from trivalent or higher monomers in the polyester resin (B) is preferably in a range of from 0.1% to 80% by mole, more preferably from 1% to 45% by mole, and particularly preferably from 1% to 40% by mole with respect to the total number of moles (100% by mole) of the constitutional units derived from all the polycarboxylic acids. The anti-offset property on the high temperature side of the toner is superior when the content of the constitutional units derived from trivalent or higher monomers is equal to or more than the lower limit value. When the content of the constitutional units derived from trivalent or higher monomers is equal to or less than the upper limit value, the formation of gel (solvent-insoluble matter) can be suppressed and the solvent solubility is superior. In addition, the glossiness in the case of being used in a color toner is also favorable.

The content of the constitutional unit derived from a tri- or higher polycarboxylic acid in the polyester resin (B) is preferably 0.1% by mole or more, more preferably from 0.1% to 80% by mole, still more preferably from 1% to 45% by mole, and particularly preferably from 1% to 40% by mole with respect to the total number of moles (100% by mole) of the constitutional units derived from all the polycarboxylic acids. The anti-offset property on the high temperature side of the toner is superior when the content of the constitutional unit derived from a tri- or higher polycarboxylic acid is equal to or more than the lower limit value. When the content of the constitutional unit derived from a tri- or higher polycarboxylic acid is equal to or less than the upper limit value, the formation of gel (solvent-insoluble matter) can be suppressed and the solvent solubility is superior. In addition, the glossiness in the case of being used in a color toner is also favorable.

The content of the constitutional unit derived from a trihydric or higher polyhydric alcohol in the polyester resin (B) is preferably 0.1% by mole or more, more preferably from 0.1% to 80% by mole, still more preferably from 1% to 45% by mole, and particularly preferably from 1% to 40% by mole with respect to the total number of moles (100% by mole) of the constitutional units derived from all the polycarboxylic acids. The anti-offset property on the high temperature side of the toner is superior when the content of the constitutional unit derived from a trihydric or higher polyhydric alcohol is equal to or more than the lower limit value.

When the content of the constitutional unit derived from a trihydric or higher polyhydric alcohol is equal to or less than the upper limit value, the formation of gel (solvent-insoluble matter) can be suppressed and the solvent solubility is superior. In addition, the glossiness in the case of being used in a color toner is also favorable.

From the viewpoint of the molecular weight distribution width which contributes to both the low temperature fixability and non-offset property (particularly hot offset resistance), it is preferable that the polyester resin (A) and the polyester resin (B) have different contents of a constitutional unit derived from a tri-t or higher polycarboxylic acid and/or a constitutional unit derived from a trihydric or higher polyhydric alcohol.

The softening temperature of the polyester resin (B) is not particularly limited, and it may be higher than 120° C. or 120° C. or lower.

The softening temperature of the polyester resin (B) is preferably 120° C. or lower and more preferably 119° C. or lower from the viewpoint of low temperature fixability of the toner and solvent solubility of the binder resin for toner.

The softening temperature of the polyester resin (B) is preferably 75° C. or higher and more preferably 80° C. or higher from the viewpoint of storage stability.

Hence, the softening temperature of the polyester resin (B) is preferably from 75° C. to 120° C. and more preferably from 80° C. to 120° C.

It is preferable that the polyester resin (A) and the polyester resin (B) have different softening temperatures from the viewpoint of separation of functions in toner properties.

The glass transition temperature (Tg) of the polyester resin (B) is preferably from 35° C. to 85° C. and more preferably from 35° C. to 82° C. The storage stability of the toner is superior when the Tg is equal to or higher than the lower limit value of the above range, and the low temperature fixability of the toner is superior when the Tg is equal to or lower than the upper limit value of the above range.

The acid value of the polyester resin (B) is preferably from 0.1 to 60 mg KOH/g and more preferably from 0.1 to 50 mg KOH/g. The reactivity of the resin tends to be improved when the acid value of the polyester resin (B) is equal to or more than the lower limit value of the above range, and the resistance to moisture is superior when the acid value is equal to or less than the upper limit value of the above range.

The weight average molecular weight (Mw) of the polyester resin (B) is preferably from 500 to 1,000,000 and more preferably from 500 to 800,000. The durability is superior when the Mw of the polyester resin (B) is equal to or more than the lower limit value of the above range, and the pulverizability and solvent solubility of binder resin for toner are superior when the Mw is equal to or less than the upper limit value of the above range.

The number average molecular weight (Mn) of the polyester resin (B) is preferably from 500 to 100,000 and more preferably from 500 to 50,000.

The peak top molecular weight (Mp) of the polyester resin (B) is preferably from 500 to 100,000 and more preferably from 500 to 50,000.

The THF-insoluble matter in the polyester resin (B) is preferably from 0% to 40% by mass, more preferably from 0% to 20% by mass, and still more preferably from 0% to 10% by mass.

The polyester resin (B) can be manufactured by the same method as in the polyester resin (A).

<Another Binder Resin>

Examples of a binder resin other than the polyester resin (A) and the polyester resin (B) may include polyester resins other than the polyester resin (A) and the polyester resin (B), a cyclic olefin resin, a styrene-based resin, a styrene-acrylic resin, an acrylic resin, and an epoxy resin. Any one kind of these may be used singly or two or more kinds thereof may be used in mixture. By concurrently using these resins and the polyester resin, there is a tendency that the fixability can be improved.

<Content of Each Component>

In the binder resin for toner of the invention, the mass ratio (polyester resin (A): polyester resin (B)) of the polyester resin (A) to the polyester resin (B) is preferably from 5:95 to 95:5, more preferably from 10:90 to 90:10, still more preferably from 25:75 to 75:25, and particularly preferably from 40:60 to 60:40. The pulverizability and solvent solubility of the binder resin for toner tend to be more favorable in a case in which the ratio of the polyester resin (A) is 5% by mass or more with respect to the sum of the polyester resin (A) and the polyester resin (B), and the storage stability of the toner at a high humidity tends to be more favorable in a case in which the ratio is 95% by mass or less.

The content of the another binder resin is preferably 30 parts by mass or less, more preferably 25 parts by mass or less, and particularly preferably 20 parts by mass or less with respect to 100 parts by mass of the sum of the polyester resin (A) and the polyester resin (B). The effect by the polyester resin (A) and the polyester resin (B) is sufficiently exerted when the content of the other binder resin is equal to or less than the upper limit value.

<Hygroscopicity Index>

The hygroscopicity index of the binder resin for toner of the invention is 2 or less, more preferably 1.8 or less, and particularly preferably 1.6 or less. The storage stability of the binder resin for toner under a high humidity condition is excellent when the hygroscopicity index is equal to or less than the upper limit value.

It is more preferable as the pulverizability index of the binder resin for toner is lower, and the lower limit thereof is not particularly limited.

In the invention, the hygroscopicity index is a value determined by the following measurement method.

(Method of Measuring Hygroscopicity Index)

The polyester resin (A) and the polyester resin (B) are respectively pulverized to obtain pulverized products, the pulverized products are sieved, and the particles which pass through a sieve with 16 mesh (mesh opening: 1.0 mm) but do not pass through a sieve with 22 mesh (mesh opening: 0.71 mm) are collected and dried for 4 hours or longer in a vacuum dryer at 40° C. After being dried, the respective particles are dry-blended in the same mass ratio as the mass ratio of the polyester resin (A) to the polyester resin (B) in the binder resin for toner, and the mixture thus obtained is weighed (X (g)). The mixture is left to stand for 48 hours in a thermo-hygrostat at 35° C. and a relative humidity of 85% and then weighed (Y (g)), and the coefficient of moisture absorption (%) is calculated by the following equation. The above operation is conducted three times, and the average value of coefficients of moisture absorption (%) thus determined is taken as the hygroscopicity index.

Coefficient of moisture absorption (%)=$(Y-X)/X \times 100$

The hygroscopicity index of the binder resin for toner can be adjusted by the content of the constitutional unit derived from isosorbide (isosorbide-derived carbon atom ratio) in the polyester resin (A), the mass ratio of the polyester resin (A) to the polyester resin (B), and the like. For example, the hygroscopicity index tends to decrease as the isosorbide-derived carbon atom ratio in the polyester resin (A) is lower or the ratio of the polyester resin (A) in the mass ratio of the polyester resin (A) to the polyester resin (B) is lower.

<Tetrahydrofuran (THF)-Insoluble Matter>

The THF-insoluble matter in the binder resin for toner of the invention is 5% by mass or less, preferably 4% by mass or less, and particularly preferably 3% by mass or less. When the THF-insoluble matter t is equal to or less than the upper limit value, the solvent solubility of the binder resin for toner in an organic solvent (such as THF) to be generally used for dissolving the polyester resin in the chemical method and the like is excellent.

It is more preferable as the THF-insoluble matter in the binder resin for toner is less, and the lower limit thereof is not particularly limited.

In the invention, the THF-insoluble matter is a value determined by the measurement method described in Examples to be described later.

The THF-insoluble matter in the binder resin for toner can be adjusted by the contents of the constitutional unit derived from a tri- or higher polycarboxylic acid and/or the constitutional unit derived from a trihydric or higher polyhydric alcohol in each of the polyester resins (A) and (B), the degree of polymerization, and the like. For example, the THF-insoluble matter tends to decrease as the contents of the constitutional unit derived from a tri- or higher polycarboxylic acid and/or the constitutional unit derived from a trihydric or higher polyhydric alcohol is lower.

<Effect of Binder Resin for Toner>

The binder resin for toner of the invention described above exhibits favorable pulverizability in the case of manufacturing a toner through a pulverization step. For example, when a mixture containing the polyester resin (A) and the polyester resin (B) is melted and kneaded and the kneaded product thus obtained is pulverized, a finer pulverized product tends to be obtained as compared to a case in which the polyester resin (A) does not contain a constitutional unit derived from isosorbide. Hence, it is possible to decrease the pulverization energy required for fine grinding when a toner is manufactured by the pulverization method. In addition, it is possible to decrease the time required for dissolution of the binder resin and the like to be dissolved in a solvent by pulverizing and finely grinding them in advance in the case of manufacturing a toner by the chemical method as well. The productivity of toner is thus improved.

From the viewpoint of exhibiting the effect described above, examples of a preferred aspect of the method for manufacturing a toner using the binder resin for toner of the invention may include a method including a step of melting and kneading a mixture containing the polyester resin (A) and the polyester resin (B) and pulverizing the kneaded product thus obtained.

The binder resin for toner of the invention also exhibits favorable solvent solubility in the case of manufacturing a toner through step dissolving a raw material in a solvent, and the formation of gel (solvent-insoluble matter) when dissolving the binder resin for toner in an organic solvent can be suppressed. For example, when a mixture containing the polyester resin (A) and the polyester resin (B) is dissolved in a solvent, the solvent solubility tends to be more favorable as compared to a case in which the polyester resin (A) does not contain a constitutional unit derived from isosorbide. The productivity of toner is thus improved.

From the viewpoint of exhibiting the effect described above, examples of a preferred aspect of the method for manufacturing a toner using the binder resin for toner of the invention may include a method including a step of dissolving the binder resin for toner of the invention in an organic solvent. Examples of a method including such a step may include a chemical method.

In addition, the toner obtained by using the binder resin for toner of the invention exhibits excellent storage stability and hardly blocks even under a high humidity condition.

According to the binder resin for toner of the invention, it is possible to make the toner excellent in all the storage stability, low temperature fixability, non-offset property, and durability.

<<Toner>>

The toner of the invention contains the binder resin for toner of the invention described above.

The toner of the invention may further contain components other than the binder resin, if necessary.

<Other Components>

Examples of components other than the binder resin may include a coloring agent, a charge control agent, a releasing agent, additives other than these, and a magnetic material.

The coloring agent is not particularly limited, but examples thereof may include carbon black, nigrosine, aniline blue, phthalocyanine blue, phthalocyanine green, Hansa yellow, rhodamine-based dyes and pigments, chrome yellow, quinacridone, benzidine yellow, rose bengal, triallyl methane-based dyes, and monoazo-based, disazo-based, condensed azo-based dyes or pigments. These coloring agents may be used singly or two or more kinds thereof may be used in mixture. In the case of a full color toner, it is possible to use benzidine yellow, monoazo-based dyes and pigments, condensed azo-based dyes and pigments, and the like as yellow, quinacridone, rhodamine-based dyes and pigments, monoazo-based dyes and pigments, and the like as magenta, and phthalocyanine blue and the like as cyan.

The charge control agent is not particularly limited, but examples thereof may include a positive charge control agent such as a quaternary ammonium salt, a basic or electron-donating organic substance; and a negative charge control agent such as a metal chelate, a metal-containing dye, and an acidic or electron-withdrawing organic substance. In the case of a color toner, the charge control agent is preferably colorless or exhibits a light color from the viewpoint of not disturbing the color tone of the toner, and examples of such a charge control agent may include a metal salt of salicylic acid or alkylsalicylic acid with chromium, zinc, aluminum, or the like, a metal complex, an amide compound, a phenol compound, and a naphthol compound thereof.

Furthermore, a vinyl polymer having a styrene-based, acrylic acid-based, methacrylic acid-based, or a sulfonic acid group may be used as a charge control agent.

The releasing agent is not particularly limited and can be appropriately selected from known releasing agents in consideration of the releasability, storage stability, fixability, coloring property, and the like of the toner and used. Examples of the releasing agent may include carnauba wax, rice wax, beeswax, polypropylene-based wax, polyethylene-based wax, synthetic ester-based wax, paraffin wax, fatty acid amide, and silicone-based wax. Any one kind of these may be used singly or two or more kinds thereof may be used in combination.

The melting point of the releasing agent is not particularly limited and can be appropriately selected in consideration of the performance of toner described above and used.

The other additives are not particularly limited, but examples thereof may include a fluidity improver (fluidity modifier) such as fine powder silica, alumina, or titania; an inorganic fine powder such as magnetite, ferrite, cerium oxide, strontium titanate, or conductive titania; a resistance regulator such as a styrene resin or an acrylic resin; and a lubricant. These may be contained as internal additives or external additives.

The toner of the invention can be used as any developer of a magnetic one-component developer, a nonmagnetic one-component developer, or a two-component developer.

It is preferable that the toner of the invention contains a magnetic material in the case of being used as a magnetic one-component developer.

Examples of the magnetic material may include ferromagnetic alloys containing iron, cobalt, nickel, and the like such as ferrite and magnetite. In addition to these, examples thereof may also include alloys which do not contain compounds or ferromagnetic elements but exhibit ferromagnetism by a proper heat treatment, for example, a so-called Heusler alloy containing manganese and copper such as manganese-copper-aluminum or manganese-copper-tin, and chromium dioxide.

<Content of Each Component>

In the toner of the invention, the content of the binder resin for toner of the invention is preferably an amount so that the total amount of the polyester resin (A) and the polyester resin (B) is 20% by mass or more with respect to the entire amount (100% by mass) of the toner. The total amount of the polyester resin (A) and the polyester resin (B) is more preferably 22% by mass or more and still more preferably 25% by mass or more. When the total amount of the polyester resin (A) and the polyester resin (B) is equal to or more than the lower limit value, the pulverizability, storage stability, low temperature fixability, non-offset property, and durability of the toner are superior as well as the effect as a binder resin for fixing the toner on paper is sufficiently exerted.

The upper limit of the content of the binder resin for toner of the invention with respect to the entire amount of the toner can be appropriately set depending on the content of other components to be arbitrarily contained, and it is typically 95% by mass although it is not particularly limited.

In a case in which the toner of the invention contains a coloring agent, the content of the coloring agent is not particularly limited, but it is preferably from 2% to 10% by mass with respect to the entire amount of the toner from the viewpoint of color tone of the toner, image density, and thermal properties.

In a case in which the toner of the invention contains a charge control agent, the content of the charge control agent is not particularly limited, but it is preferably from 0.5% to 5% by mass with respect to the entire amount of the toner. The electric charge amount of the toner tends to be at a sufficient level in a case in which the content of the charge control agent is 0.5% by mass or more, and a decrease in the electric charge amount due to aggregation of the charge control agent tends to be suppressed in a case in which the content is 5% by mass or less.

In a case in which the toner of the invention contains a releasing agent, the content of the releasing agent is not particularly limited, but it is preferably from 0.3% to 15% by mass with respect to the entire amount of the toner from the viewpoint of the performance of toner described above. The lower limit of the content of the releasing agent is more preferably 1% by mass and particularly preferably 2% by mass. In addition, the upper limit of the content of the releasing agent is more preferably 13% by mass and particularly preferably 12% by mass. Hence, the content of the releasing agent is more preferably from 1% to 13% by mass and particularly preferably from 2% to 12% by mass with respect to the entire amount of the toner.

In a case in which the toner of the invention contains other additives, the content of the other additives is not particularly limited, but it is preferably from 0.05% to 10% by mass with respect to the entire amount of the toner. The effect of modifying the performance of toner tends to be sufficiently obtained in a case in which the content of other additives is 0.05% by mass or more, and the image stability by the toner tends to be favorable in a case in which the content is 10% by mass or less.

In a case in which the toner of the invention contains a magnetic material, the content of the magnetic material is not particularly limited, but it is preferably from 3% to 70% by mass with respect to the entire amount of the toner since the magnetic material greatly affects the pulverizability. The electric charge amount of the toner tends to be at a sufficient level in a case in which the content of the magnetic material is 3% by mass or more, and the taxability and pulverizability of the toner tend to be favorable in a case in which the content is 70% by mass or less. The upper limit of the content of the magnetic material is more preferably 60% by mass and particularly preferably 50% by mass. Hence, the content of the magnetic material is more preferably from 3% to 60% by mass and particularly preferably from 3% to 50% by mass with respect to the entire amount of the toner.

The average particle diameter of the toner of the invention is not particularly limited, but it is preferably from 1 to 10 μm and more preferably from 3 to 8 μm. The productivity of the toner is excellent when the average particle diameter is equal to or greater than the lower limit value of the above range, and high image quality is achieved when the average particle diameter is equal to or smaller than the upper limit value. Incidentally, in the present specification, the average particle diameter is a value measured by the measurement method to be described later.

<Method of Manufacturing Toner>

The method for manufacturing the toner of the invention is not particularly limited, and a known method such as a pulverization method or a chemical method can be utilized.

Examples of the method for manufacturing the toner of the invention by a pulverization method may include a manufacturing method including a step of melting and kneading a mixture containing the polyester resin (A) and the polyester resin (B) and pulverizing the kneaded product (toner lump) thus obtained.

The mixture may contain another binder resin, a coloring agent, a charge control agent, a releasing agent, other additives, a magnetic material, and the like. The melting and kneading can be conducted by using a known kneading machine such as a twin screw extruder. The melting and kneading is typically conducted under the conditions having a set temperature of from 100° C. to 200° C. The kneaded product can be pulverized by using a known pulverizer such as a jet mill. The pulverization may be stepwisely conducted such that coarse pulverization is followed by fine pulverization, or the pulverization may be conducted by one step. After pulverization, the pulverized product thus obtained may be classified. After pulverization or classification, the product may be subjected to an external addition treatment by inorganic particles and the like if necessary. The toner of the invention is thus obtained.

Examples of the method for manufacturing the toner of the invention by a chemical method may include a method in which the polyester resin (A), the polyester resin (B), and if necessary, another binder resin, a coloring agent, a charge control agent, a releasing agent, other additives, a magnetic material, and the like are dissolved or dispersed in an organic solvent, granulation is conducted in an aqueous medium, the organic solvent is then removed from the resultant, the residue is washed and dried to obtain toner particles, and if necessary, the toner particles are subjected to an external addition treatment by inorganic particles and the like to obtain a toner and a method in which the polyester resin (A) and the polyester resin (B) are dissolved in a solvent and neutralized, the solution is then finely dispersed in water and subjected to desolvation to obtain a water type emulsion, an aqueous fine dispersion of another binder resin, a coloring agent, a charge control agent, a releasing agent, and other additives is prepared if necessary, the water type emulsion is mixed with this aqueous fine dispersion, the mixture is subjected to aggregation, coalescence, dehydration, washing, and drying to obtain toner particles, and if necessary, the toner particles are subjected to an external addition treatment by inorganic particles to obtain a toner.

Examples of the solvent may include tetrahydrofuran, ethyl acetate, methyl ethyl ketone, and isopropyl alcohol. Examples of the aqueous medium may include water.

A step of melting and kneading a mixture containing the polyester resin (A) and the polyester resin (B) and pulverizing the kneaded product thus obtained may be conducted before dissolving or dispersing the mixture in a solvent. Alternatively, a step of separately melting and kneading the polyester resin (A) and the polyester resin (B), then mixing the respective kneaded products thus obtained together, and pulverizing the mixture thus obtained may be conducted before dissolving or dispersing the mixture in a solvent.

As the method for manufacturing the toner of the invention, a method including a step of melting and kneading a mixture containing the polyester resin (A) and the polyester resin (B) and pulverizing the kneaded product thus obtained is preferable from the viewpoint of the usefulness of excellent pulverizability of the binder resin for toner.

A method including a step of dissolving the binder resin for toner in an organic solvent is preferable from the viewpoint of the usefulness of excellent solvent solubility of the binder resin for toner. In addition, the binder resin for toner of the invention exhibits excellent pulverizability, and it thus has a small particle diameter and can be efficiently dissolved in a solvent.

Components other than the binder resin may be dissolved or dispersed in the solvent when the binder resin for toner is dissolved in a solvent.

<Effect of Toner>

The toner of the invention described above contains the binder resin for toner of the invention, and it thus exhibits excellent pulverizability, storage stability, low temperature fixability, non-offset property, and durability as described above. In addition, pulverizability of the kneaded product is favorable in the case of manufacturing a toner through a step of melting and kneading the binder resin for toner and the like and pulverizing the kneaded product thus obtained. In addition, solubility of the binder resin for toner in an organic solvent is favorable in the case of manufacturing a toner through a step of dissolving the binder resin for toner in a solvent in a chemical method. Hence, the productivity is excellent in both steps.

<Application>

The toner of the invention is suitably used in development of an electrostatic image or a magnetic latent image in an electrophotographic method, an electrostatic recording method, an electrostatic printing method, or the like.

The toner of the invention can be used as any developer of a magnetic one-component developer, a nonmagnetic one-component developer, or a two-component developer. The toner of the invention can be used as a magnetic one-component developer as it is when the toner of the invention contains a magnetic material. The toner of the invention can be used as a nonmagnetic one-component developer as it is when the toner of the invention does not contain a magnetic material. In addition, the toner of the invention can be used as a two-component developer when a toner which does not contain a magnetic material as the toner of the invention and a carrier are used concurrently.

As the carrier, it is possible to use known carriers such as magnetic substances such as an iron powder, a magnetite powder, and a ferrite powder, those obtained by coating the surface thereof with a resin, and a magnetic carrier. As the coating resin for the resin-coated carrier, it is possible to use a styrene-based resin, an acrylic resin, a styrene acrylic copolymer-based resin, a silicone-based resin, a modified silicone-based resin, and a fluorine-based resin which are generally known, and any mixture of these resins.

EXAMPLES

Hereinafter, the invention will be described in more detail with reference to Examples, but the invention is not limited by the following Examples.

The evaluation methods used in each example to be described later are as follows.

<Method of Evaluating Physical Properties of Polyester Resin>

(Glass Transition Temperature (Tg))

The temperature at the intersection point between the baseline on the low temperature side of the chart when a polyester resin was filled in an aluminum cell by 10±0.5 mg and heated on a hot plate at 100° C. for 10 minutes, the cell was brought into close contact with dry ice and rapidly cooled to 0° C. or lower, and the measurement was then conducted at a rate of temperature increase of 5° C./min by using a differential scanning calorimeter DSC-60 manufactured by Shimadzu Corporation and the tangent of the endothermic curve in the vicinity of the glass transition temperature was determined and the temperature was taken as Tg.

(Softening Temperature)

The measurement is conducted by using a polyester resin as a measurement sample at a load of 294 N (30 kgf) while constantly increasing the temperature at a rate of temperature increase of 3° C./min by using a nozzle of 1 mm $\phi \times 10$ mm and a flow tester CFT-500 manufactured by Shimadzu Corporation. The measurement sample is prepared by 1.0 g. The temperature at which the measurement sample was discharged by 4 mm from the baseline was determined, and the temperature was taken as the softening temperature.

(Acid Value)

A polyester resin was precisely weighed (A (g)) by about 0.2 g and introduced into a side-arm Erlenmeyer flask, 20 mL of benzyl alcohol was added thereto, and the polyester resin was heated by using a heater at 230° C. for 15 minutes in a nitrogen atmosphere to be dissolved. The solution was cooled to room temperature, 20 mL of chloroform and a few drops of a phenolphthalein solution were then added thereto, and the titration was conducted with a 0.02 normal KOH benzyl alcohol solution (titre=B (mL), potency of KOH solution=p). The blank measurement was conducted in the same manner (titre=C (mL)), and the acid value of the polyester resin was calculated according to the following equation.

Acid value (mg KOH/g)=(B−C)×0.02×56.11×p÷A (Average Molecular Weight) An elution curve was obtained by gel permeation chromatography under the following conditions, and the average molecular weight (Mw, Mn, and Mp) and the molecular weight dispersity (Mw/Mn) were determined in terms of standard polystyrene from the retention time corresponding to the peak value on the elution curve thus obtained.

Apparatus: HLC 8020 manufactured by TOSOH CORPORATION. Column: three columns of TSKgel (registered trademark) GMHXL (column size: 7.8 mm (inner diameter)×30.0 cm (length)) manufactured by TOSOH CORPORATION connected in series.

Oven temperature: 40° C.
Eluent: tetrahydrofuran (THF).
Sample concentration: 4 mg/10 mL.
Filtration conditions: sample solution is filtered through 0.45 μm Teflon (registered trademark) membrane filter.
Flow velocity: 1 mL/min.
Injection volume: 0.1 mL.
Detector: differential refractive index (RI) detector.

(THF-Insoluble Matter in Polyester Resin)

A polyester resin was weighed (D (g)) by about 0.5 g and introduced into a 100 mL Erlenmeyer flask, 50 mL of THF was added thereto, the polyester resin was dissolved by immersing the flask in a water bath set at 70° C. for 3 hours, thereby preparing a THF solution. Meanwhile, Celite 545 was tightly filled in a glass filter 1GP100 up to 6 to 7 portions, dried in a dryer at 105° C. for 3 hours or longer, and weighed (E (g)).

Subsequently, the THF solution in which the polyester resin was dissolved was transferred into this dried glass filter and subjected to suction filtration. All the contents remaining on the wall of the Erlenmeyer flask were transferred into the glass filter by using acetone, acetone was allowed to flow in the glass filter to drop the soluble matter into the suction bottle, suction was continuously conducted so that the solvent did not remain in the filter, and the residue was then dried in a vacuum dryer at 80° C. for 3 hours or longer and weighed (F (g)). The THF-insoluble matter (% by mass) was calculated by the following equation.

THF-insoluble matter (% by mass)=(F−E)/D×100

<Hygroscopicity Index of Binder Resin for Toner>

The polyester resin (A) and the polyester resin (B) were respectively pulverized to obtain pulverized products, the pulverized products were sieved, and the particles which passed through a sieve with 16 mesh (mesh opening: 1.0 mm) but did not pass through a sieve with 22 mesh (mesh opening: 0.71 mm) were collected and dried for 4 hours or longer in a vacuum dryer at 40° C. After being dried, the respective particles were dry-blended in the same mass ratio as the mass ratio of the polyester resin (A) to the polyester resin (B) in the binder resin for toner of each of Examples and Comparative Examples, and the mixture thus obtained was weighed (X (g)). The mixture was left to stand for 48 hours in a thermo-hygrostat at 35° C. and a relative humidity of 85% and then weighed (Y (g)), and the coefficient of moisture absorption (%) was calculated by the following equation. The above operation was conducted three times, and the average value of coefficients of moisture absorption (%) thus determined was taken as the hygroscopicity index.

Coefficient of moisture absorption (%)=(Y−X)/X×100

<THF-Insoluble Matter in Binder Resin for Toner>

The THF-insoluble matter (% by mass) in the binder resin for toner was calculated from the THF-insoluble matter (% by mass) in each of the polyester resin (A) and the polyester resin (B) used in each of Examples and Comparative Examples and the mass ratio thereof by the following equation.

THF-insoluble matter in binder resin for toner=$A_1$× $A_2$/100+$B_1$×$B_2$/100

Here, $A_1$ and $B_1$ respectively represent the THF-insoluble matter (% by mass) in the polyester resin (A) and the polyester resin (B), and $A_2$ and $B_2$ respectively represent the proportion (% by mass) of the polyester resin (A) and the polyester resin (B) when the sum of the polyester resin (A) and the polyester resin (B) is taken as 100% by mass.

<Method of Evaluating Toner>

(Storage Stability, Condition 1, Low Humidity)

A toner was weighed by about 5 g and introduced into a sample bottle, this was left to stand for about 24 hours in a dryer maintained at 35° C. and a humidity of 50%, and the degree of aggregation of the toner was evaluated and used as an index of storage stability (blocking resistance). The evaluation criteria were as follows.

⊙ (Significantly favorable): toner is dispersed by only turning sample bottle upside down.

○ (Favorable): toner is dispersed by turning sample bottle upside down and tapping it 2 or 3 times.

Δ (Usable): toner is dispersed by turning sample bottle upside down and tapping it 4 or 5 times.

× (Inferior): toner is not dispersed by turning sample bottle upside down and tapping it 5 times.

<Method of Evaluating Toner>

(Storage Stability, Condition 2, High Humidity)

A toner was weighed by about 5 g and introduced into a sample bottle, this was left to stand for about 24 hours in a dryer maintained at 35° C. and a humidity of 85%, and the degree of aggregation of the toner was evaluated and used as an index of storage stability (blocking resistance). The evaluation criteria were as follows.

⊙ (Significantly favorable): toner is dispersed by only turning sample bottle upside down.

○ (Favorable): toner is dispersed by turning sample bottle upside down and tapping it 2 or 3 times.

Δ (Usable): toner is dispersed by turning sample bottle upside down and tapping it 4 or 5 times.

× (Inferior): toner is not dispersed by turning sample bottle upside down and tapping it 5 times.

(Low Temperature Fixability)

Printing was conducted by using a printer (SPEEDIA (registered trademark) N4-614 manufactured by CASIO COMPUTER CO., LTD.) which had a fixing roller not coated with silicone oil, was set to have a roller speed of 100 mm/sec, and was capable of changing the temperature, and the low temperature fixability was evaluated. Specifically, the final temperature at which the toner started to be fixed on the paper when the toner was fixed on paper was taken as the fixing temperature, and the low temperature fixability was judged according to the following criteria.

⊙ (Significantly favorable): fixing temperature is lower than 140° C.

○ (Favorable): fixing temperature is 140° C. or higher and lower than 150° C.

Δ (Usable): fixing temperature is 150° C. or higher and lower than 160° C.

× (Inferior): fixing temperature is 160° C. or higher.

(Hot Offset Resistance)

By using a printer which had a fixing roller not coated with silicone oil, was set to have a roller speed of 30 mm/sec, and was capable of changing the roller temperature, a solid image of 4.5 cm in length×15 cm in width was printed as a test pattern at a toner density of 0.5 mg/cm² and a roller temperature of every 5° C. At this time, the lowest temperature at which the toner was transferred to the fixing roller by the hot offset phenomenon at the time of fixing was determined as the hot offset occurring temperature, and the hot offset resistance (non-offset property) was judged according to the following criteria.

⊙ (Significantly favorable): hot offset occurring temperature is 200° C. or higher.

○ (Favorable): hot offset occurring temperature is 180° C. or higher and lower than 200° C.

Δ (Usable): hot offset occurring temperature is 170° C. or higher and lower than 180° C.

× (Inferior): hot offset occurring temperature is lower than 170° C.

(Durability)

After 10,000 sheets of test pattern were printed by the same method as in the evaluation of hot offset resistance, the durability was evaluated by adhesion to the blade and fogging of the printed surface according to the following criteria.

⊙ (Significantly favorable): adhesion to blade and fogging are not observed.

○ (Favorable): adhesion to blade and fogging are significantly slightly observed.

Δ (Usable): adhesion to blade and fogging are slightly observed but can be improved by additives and the like.

× (Inferior): adhesion to blade and fogging are greatly observed.

(Pulverizability)

The pulverizability was evaluated by determining the residual rate of powder remaining on the mesh by the following procedure for the pulverized product obtained by finely pulverizing a toner lump to have a particle diameter of 10 μm or less at the time of manufacture of the toner.

The pulverized product was sieved, and the powder which passed through 16 mesh but did not pass through 22 mesh was obtained. This classified powder was precisely weighed by 10.00 g (G (g)), pulverized for 10 minutes by using a pulverizer Trio slender (manufactured by Trio Science Co.), and then sieved through a sieve with 30 mesh. The mass (H (g)) of the powder which did not pass through the sieve with 30 mesh was precisely weighed, and the residual rate was calculated by the following equation. This operation was conducted three times, and the average value thereof was taken as the residual rate of the toner in each example.

Residual rate (%)=($H/G$)×100

The pulverizability was evaluated by the residual rate thus obtained as follows.

⊙ (Significantly favorable): residual rate is less than 55%.

○ (Favorable): residual rate is 55% or more and less than 65%.

Δ (Usable): residual rate is 65% or more and less than 75%.

× (Inferior): residual rate is 75% or more.

(Particle Diameter and Particle Size Distribution of Particles)

The particle diameter and particle size distribution of the particles were measured by using a laser diffraction type particle diameter measuring instrument (trade name: "LA-920", manufactured by HORIBA, Ltd.). According to the operation manual of the measuring instrument, a flow cell for measurement was used, distilled water was added into the cell, the relative refractive index was selected and set to 1.20, and the adjustment of the optical axis, fine adjustment of the optical axis, and blank measurement were conducted by setting the particle diameter standard to a volume standard. Next, an aqueous dispersion of particles was added into the cell so as to have a concentration at which the transmittance was in a range of from 70% to 90%, an ultrasonic treatment was conducted for 1 minute at an intensity of 5, and the particle size distribution of the particles was measured. The particle diameter (median diameter) corresponding to a cumulative percentage of 50% on the volume distribution standard in the particle size distribution thus measured was taken as the average particle diameter.

Production Examples 1 to 5

Manufacture of Polyester Resin

The polycarboxylic acids and polyhydric alcohols presented in Table 1 and titanium alkoxide to be 500 ppm with respect to the entire acid components were introduced into a reaction vessel equipped with a distillation column.

Subsequently, the number of revolutions of the stirring blade in the reaction vessel was maintained at 120 rpm, the temperature was started to increase, heating was conducted so that the temperature in the reaction system reached 265° C., and the esterification reaction was conducted while maintaining this temperature. After the esterification reaction was completed and discharge of water from the reaction system was not observed any longer, the temperature in the reaction system was lowered and maintained at 245° C., the pressure in the reaction vessel was lowered over about 40 minutes, the degree of vacuum was set to 133 Pa, and the condensation reaction was conducted while discharging the diol component from the reaction system.

The viscosity of the reaction system increased as the reaction proceeded, the degree of vacuum was increased as the viscosity increased, and the condensation reaction was conducted until the torque of the stirring blade reached a value indicating the desired softening temperature. Thereafter, the stirring was stopped at the time point at which the predetermined torque was indicated, the reaction system was returned to normal pressure, and the reaction product was taken out from the reaction vessel by pressurizing with nitrogen, thereby obtaining polyester resins A to E. The physical properties of the polyester resins A to E thus obtained are presented in Table 1.

Incidentally, the composition of the polycarboxylic acids and polyhydric alcohols introduced presented in Table 1 is parts by mole of each component when the total number of moles of the entire acid components (all the polycarboxylic acids) is taken as 100 parts by mole.

As the "bisphenol A PO adduct", polyoxypropylene(2.3)-2,2-bis(4-hydroxyphenyl)propane was used.

The isosorbide-derived carbon atom ratio is the ratio (%) of the number of carbon atoms contained in the constitutional unit derived from isosorbide to the number of entire carbon atoms contained in the polyester resin.

The isosorbide-derived carbon atom ratio and the content of the trivalent or higher monomer component with respect to the total number of moles of the entire acid components were respectively calculated from the composition introduced.

TABLE 1

|  |  |  | Production Example 1 | Production Example 2 | Production Example 3 | Production Example 4 | Production Example 5 |
|---|---|---|---|---|---|---|---|
|  | Polyester resin |  | A | B | C | D | E |
| Composition introduced | Terephthalic acid | Parts by mole | 94 | 94 | 70 | 73 | 100 |
|  | Anhydrous trimellitic acid | Parts by mole | 6 | 6 | 30 | 27 | 0 |
|  | Bisphenol A PO adduct | Parts by mole | 65 | 118 | 95 | 100 | 90 |
|  | Ethylene glycol | Parts by mole | 55 | 0 | 40 | 37 | 28 |
|  | Isosorbide | Parts by mole | 20 | 2 | 20 | 0 | 0 |
| Isosorbide-derived carbon atom ratio | | % | 4.9 | 0.4 | 3.9 | 0 | 0 |
| Content of trivalent or higher monomer component with respect to total number of moles of entire acid components | | mol % | 6 | 6 | 30 | 27 | 0 |
| Physical properties | Tg | °C. | 66 | 50 | 64 | 57 | 50 |
|  | Softening temperature | °C. | 112 | 92 | 143 | 110 | 90 |
|  | Acid value | mg KOH/g | 12 | 4.3 | 3.4 | 12 | 7.5 |
|  | Mn |  | 1500 | 1300 | 1400 | 2100 | 1500 |
|  | Mw |  | 5100 | 3800 | 39000 | 26000 | 4300 |
|  | Mp |  | 3800 | 3200 | 2000 | 2900 | 3800 |
|  | THF-insoluble matter | wt % | 0 | 0 | 19 | 1.8 | 0 |

Example 1

A mixture was obtained by mixing 89 parts by mass of a polyester resin, 7 parts by mass of a quinacridone pigment (HOSTAPARM PINK E, C.I. No. Pigment Red 122 manufactured by Clariant), 3 parts by mass of carnauba wax No. 1 (manufactured by TOYO ADL CORPORATION), and 1 part by mass of a negatively chargeable charge control agent (LR-147 manufactured by Japan Carlit Co., Ltd.) by using a Henschel mixer for 5 minutes. As the polyester resin, the polyester resin A and polyester resin D produced above were used in a mass ratio of A:D=50:50. In other words, the ratio of the polyester resin A to the total mass of the binder resin for toner was set to 50% by mass, and the ratio of the polyester resin D to 50% by mass.

Subsequently, the mixture thus obtained was melted and kneaded by using a twin screw kneader. The melting and kneading was conducted by setting the external temperature of the barrel 1 to 30° C., the barrel 2 to 60° C., the barrel 3 to 100° C., and the barrel 4 onwards to 120° C. After kneading, the resultant was cooled, thereby obtaining a toner lump. The toner lump thus obtained was finely pulverized to have a particle diameter of 10 μm or less by using a jet mill of a fine pulverizer, thereby obtaining a pulverized product. The pulverized product thus obtained was arranged to have an average particle diameter of 4 μm or more and 9 μm or less by excluding fine particles having a particle diameter of 3 μm or less by using a classifier. To 100 parts by mass of the fine powder thus obtained, 0.25 part by mass of silica (R-972 manufactured by EVONIK) was added and attached by mixing them together by using a Henschel mixer, thereby obtaining a toner.

The toner thus obtained was evaluated by the evaluation methods described above. The results are presented in Table 2.

Examples 2 and 3 and Comparative Examples 1 to 4

Toners were obtained by the same method as in Example 1 except that the composition (the kind of the polyester resin and the ratio (% by mass) thereof to the total mass) of the binder resin for toner was changed as presented in Table 2.

The toners thus obtained were evaluated by the evaluation methods described above. The results are presented in Table 2.

TABLE 2

|  |  |  | Example 1 | Example 2 | Example 3 | Comparative Example 1 | Comparative Example 2 | Comparative Example 3 | Comparative Example 4 |
|---|---|---|---|---|---|---|---|---|---|
| Binder resin for toner | Polyester resin (A) (wt %) | A | 50 | 50 | 50 | — | — | 100 | — |
|  | Polyester resin (B) (wt %) | B | — | — | 50 | — | — | — | — |
|  |  | C | — | — | — | 50 | — | — | — |
|  |  | D | 50 | — | — | 50 | 50 | — | 100 |
|  |  | E | — | 50 | — | — | 50 | — | — |
|  | Hygroscopicity index |  | 1.5 | 1.5 | 1.5 | 1.3 | 0.6 | 2.3 | 0.6 |
|  | THF-insoluble matter (wt %) |  | 0.9 | 0 | 0 | 9.4 | 0.9 | 0 | 1.8 |
| Properties of polyester resin (A) | Isosorbide-derived carbon atom ratio (%) |  | 4.9 | 4.9 | 4.9 | — | — | — | — |
|  | Trivalent or higher monomer component (mol %) |  | 6 | 6 | 6 | — | — | — | — |
| Properties of polyester resin (B) | Softening temperature (° C.) |  | 92 | 110 | 92 | 143, 110 | 110, 90 | — | 110 |

TABLE 2-continued

| | | Example 1 | Example 2 | Example 3 | Comparative Example 1 | Comparative Example 2 | Comparative Example 3 | Comparative Example 4 |
|---|---|---|---|---|---|---|---|---|
| Properties of toner | Storage stability (low humidity) | ⊙ | ○ | ○ | ⊙ | ○ | ⊙ | ○ |
| | Storage stability (high humidity) | ○ | ○ | ○ | ○ | ⊙ | X | ⊙ |
| | Low temperature fixability | ⊙ | ⊙ | ⊙ | ⊙ | ⊙ | ⊙ | ⊙ |
| | Hot offset resistance | ○ | Δ | Δ | ○ | Δ | ○ | ○ |
| | Durability | ○ | ○ | ○ | ⊙ | ⊙ | ○ | ⊙ |
| | Pulverizability | ⊙ | ⊙ | ⊙ | ○ | X | ⊙ | X |

As presented in the results, it was confirmed that the toners of Examples 1 to 3 exhibited favorable pulverizability and the pulverizability of the binder resin for toner used in each toner was favorable. In addition, these binder resins for toner exhibited excellent solvent solubility as the THF-insoluble matter therein was 5% by mass. In addition, the toners of Examples 1 to 3 exhibited excellent storage stability, low temperature fixability, hot offset resistance, and durability.

On the contrary, in Comparative Example 1, the binder resin for toner exhibited poor solvent solubility since the polyester resin A having a softening temperature of higher than 120° C. was used therein as a polyester resin containing an isosorbide component and the THF-insoluble matter in the binder resin for toner was more than 5% by mass. In addition, the pulverizability was inferior as compared to Examples 1 to 3.

In Comparative Example 2, the binder resin for toner exhibited poor pulverizability since the polyester resins D and E which both did not contain an isosorbide component were combined therein.

In Comparative Example 3, the toner exhibited poor storage stability under a high humidity condition since the polyester resin A which contained an isosorbide component and had a softening temperature of 120° C. or lower was singly used in the binder resin for toner and the hygroscopicity index thereof was high.

In Comparative Example 4, the pulverizability was poor since the polyester resin D which did not contain an isosorbide component was singly used.

INDUSTRIAL APPLICABILITY

The binder resin for toner of the invention is used in the manufacture of a toner. According to the binder resin for toner of the invention, a toner exhibiting excellent storage stability, low temperature fixability, non-offset property, and durability can be obtained. In addition, the binder resin for toner exhibits excellent pulverizability and solvent solubility, and the productivity of toner can be thus enhanced.

The toner of the invention can be used in the development of electrostatic images or magnetic latent images in an electrophotographic method, an electrostatic recording method, an electrostatic printing method, and the like.

The invention claimed is:

1. A binder resin, comprising:
a polyester resin (A) which contains a constitutional unit derived from a polyhydric alcohol and a polycarboxylic acid, and has a softening temperature of 120° C. or lower; and
a polyester resin (B) different from the polyester resin (A), wherein
the polycarboxylic acid is selected from the group consisting of aromatic dicarboxylic acid, aliphatic dicarboxylic acid and tri- or higher polycarboxylic acid;
the aliphatic dicarboxylic acid is selected from the group consisting of sebacic acid, isodecylsuccinic acid, dodecenylsuccinic acid, maleic acid, fumaric acid, adipic acid, succinic acid; and esters and acid anhydrides thereof,
the constitutional unit derived from a polyhydric alcohol contains a constitutional unit derived from isosorbide,
the binder resin has a hygroscopicity index of 2 or less and
the binder resin comprises a tetrahydrofuran-insoluble matter at 5% by mass or less.

2. The binder resin according to claim 1, wherein a ratio of the number of carbon atoms contained in the constitutional unit derived from isosorbide to the number of entire carbon atoms contained in the polyester resin (A) is from 0.1% to 30%.

3. The binder resin according to claim 1,
wherein the polyester resin (A) is a polycondensate of a monomer mixture comprising at least one selected from the group consisting of all the tri- or higher poly carboxylic acid and a trihydric or higher polyhydric alcohol in a range of from 0.1% to 80% by mole with respect to the total number of moles of entire acid components.

4. The binder resin according to claim 1,
wherein a softening temperature of the polyester resin (B) is 120° C. or lower.

5. The binder resin according to claim 1, wherein a ratio of the number of carbon atoms contained in the constitutional unit derived from isosorbide to the number of entire carbon atoms contained in the polyester resin (B) is less than 1%.

6. The binder resin according to claim 1, wherein a mass ratio of the polyester resin (A) to the polyester resin (B) is from 5:95 to 95:5.

7. A toner comprising the binder resin according to claim 1.

8. The binder resin according to claim 1, wherein the softening temperature of the polyester resin (A) is 80° C. or higher and 120° C. or lower.

9. The binder resin according to claim 1, wherein the glass transition temperature of the polyester resin (A) is from 35° C. to 82° C.

10. The binder resin according to claim 1, wherein the acid value of the polyester resin (A) is 50 mg KOH/g or lower.

11. The binder resin according to claim 1, wherein the softening temperature of the polyester resin (B) is 80° C. or higher.

12. The binder resin according to claim 1, wherein the glass transition temperature of the polyester resin (B) is from 35° C. to 82° C.

13. The binder resin according to claim 1, wherein the acid value of the polyester resin (B) is 50 mg KOH/g or lower.

14. The binder resin according to claim 1, wherein a mass ratio of the polyester resin (A) to the polyester resin (B) is from 25:75 to 75:25.

15. The binder resin according to claim 1, wherein a mass ratio of the polyester resin (A) to the polyester resin (B) is from 40:60 to 60:40.

16. The binder resin according to claim 1, wherein the content of a binder resin other than the polyester resin (A) and the polyester resin (B) is 25 parts by mass or less with respect to 100 parts by mass of the sum of the polyester resin (A) and the polyester resin (B).

17. The binder resin according to claim 1, wherein the content of a binder resin other than the polyester resin (A) and the polyester resin (B) is 20 parts by mass or less with respect to 100 parts by mass of the sum of the polyester resin (A) and the polyester resin (B).

* * * * *